Oct. 7, 1947.　　　　K. E. ADAMS　　　　2,428,732
TIRE DRIER
Filed Nov. 1, 1944
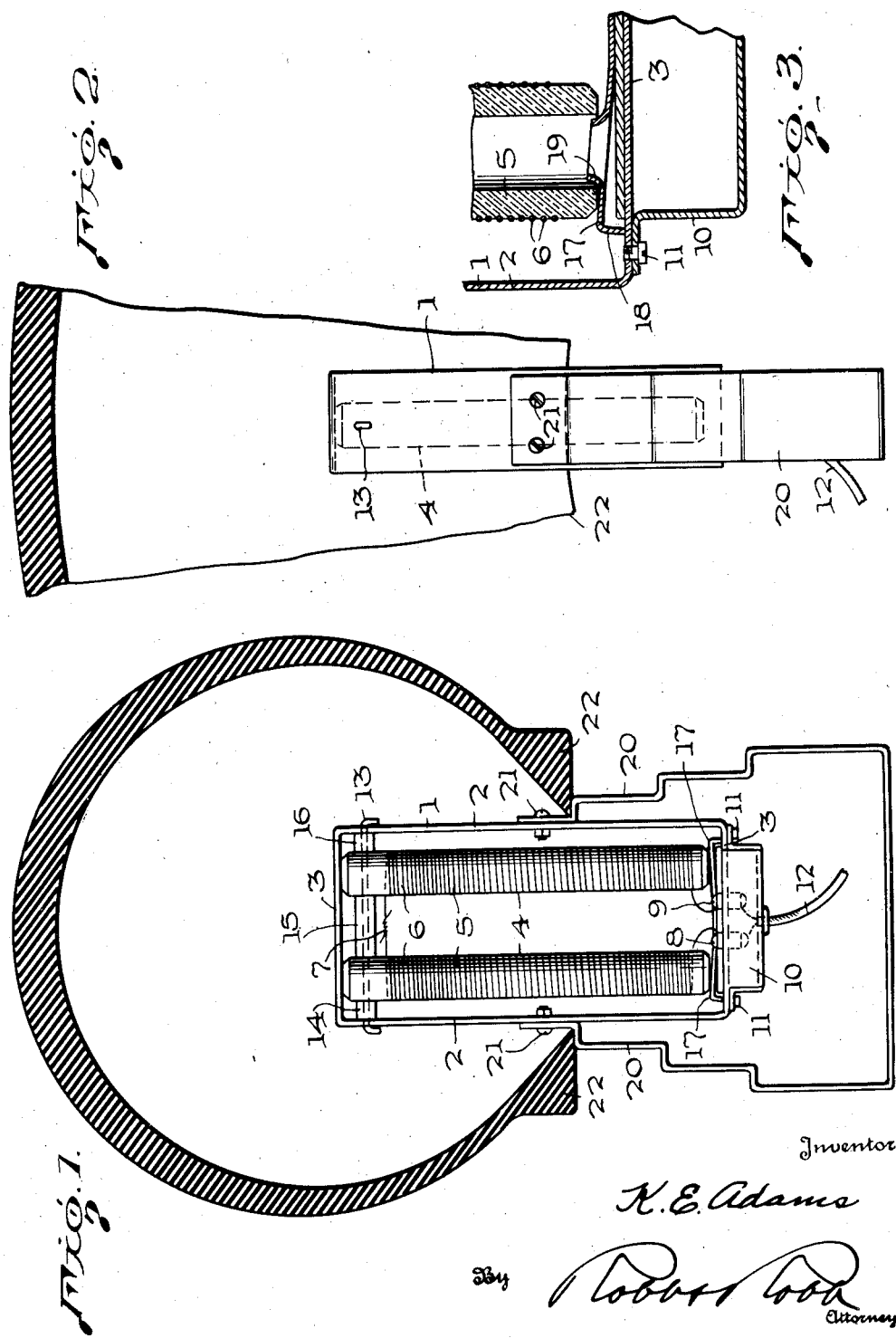

Patented Oct. 7, 1947

2,428,732

UNITED STATES PATENT OFFICE 2,428,732

TIRE DRIER

Koy E. Adams, Shelbyville, Tenn.

Application November 1, 1944, Serial No. 561,442

3 Claims. (Cl. 219—19)

This invention relates to driers, and more particularly to a novel drier unit for removing moisture from rubber tires preliminary to repair or vulcanization.

It is a well known fact that rubber articles cannot be successfully patched or vulcanized when wet or damp, and this is especially true of automobile tires. Consequently, it is often necessary to let a tire remain in a dry place for several days before it can be properly and safely vulcanized. The average repair shop or vulcanizing plant has no special facilities for expediting the drying operation, although the practice of placing the tires in the vicinity of the steam boiler which forms a part of the vulcanizing equipment, has been resorted to in some instances to aid in drying the tires. This is at best an unsatisfactory and uncertain expedient, because the tires are in the way, and no one can tell when they are absolutely dry. If any moisture is present in the tire during the vulcanizing operation, steam will accumulate and may cause the inserted airbag to burst when it is filled with air. More important still is the fact that the moisture weakens the repair.

The presence of moisture in tires is of particular concern in the case of tractor tires and other large tires, many of which contain a liquid or a liquid-filled inner tube when in use. When these tires are punctured, the liquid wets the tire and makes it impossible to repair the same satisfactorily without pre-drying the tire.

The primary object of my invention is to provide a simple, compact, and inexpensive heater unit, preferably of the electrical type, which may be effectively employed to reduce the time of pre-drying a tire preliminary to vulcanizing the same, and which concentrates the heat at the precise spot or other limited area where the repair is to be made.

Another object of my invention is to provide a tire drier which will accommodate tires of different sizes and in such a way that the spread of the tire opening and depth at which the drying element is inserted are automatically controlled.

A further object of my invention is to provide a novel tire drier unit which may be quickly and easily inserted into the tire between the usual beads on opposite sides of the tire, and which, when so inserted, will be supported and sustained in position by the gripping action of the tire beads.

A still further object of the invention is to provide a tire drier unit which includes one or more elongated heater elements which may be inserted into the tire to any desired depth for the purpose of automatically regulating the heating effect of the heater element in proportion to the length of the heater element embraced by the tire.

Other and further objects and advantages of the invention will be hereinafter described and the novel features thereof defined by the appended claims.

In the drawing:

Figure 1 is a view of my tire drier unit in side elevation, with the unit inserted in a tire and gripped between the tire beads to sustain the drier unit in operative position, the tire being shown in section;

Figure 2 is a view taken at right angles to Figure 1, with portions of the tire broken away; and Figure 3 is a fragmentary detail sectional view, showing the manner of mounting the lower ends of the heater elements.

Like reference characters designate corresponding parts in the several figures of the drawing, wherein 1 denotes a generally rectangular box-like frame which is of substantially greater length than width, said frame including laterally spaced side walls 2, 2, which are interconnected at their opposite ends by the end walls 3, 3. Mounted within the frame 1 and extending from end to end thereof in generally parallel relation to the side walls 2, 2, is at least one heater element 4. The number of such heater elements may be varied as desired, and for the purposes of illustration of the invention, I have shown two heater elements which I have found will produce satisfactory results for use in drying large tires, such as tractor tires and the like.

Each heater element preferably comprises an elongated tubular member 5 of electrical insulating material about each of which is wound a coil of electrical resistance wire 6. The coils of the two heater elements are preferably connected together at one end, as indicated at 7, and the coils at their opposite ends are respectively connected to terminals 8, 9, carried by the bottom wall 3 of the frame and housed within a cover or casing 10 secured to the end of the frame by screws 11, 11, or other fastenings. The terminals are in turn connected to an extension cord 12 which may be plugged into any convenient power outlet. According to the arrangement just described, the heater elements are connected in series, but it is to be understood that they may be connected in parallel, if desired.

The heater elements are suitably secured to the frame in any convenient manner, as by means of a pin 13 extended through the opposite side walls 2, 2, of the frame and through the tubular members 5 at one end of the latter. Spacers of porcelain or other insulating material, designated 14, 15 and 16, are arranged on the pin 13 to maintain the heater elements in parallel spaced relation to each other. The opposite ends of the heater elements each abut against a plate 17, each plate being suitably spot-welded or otherwise secured at one end to the end wall 3 of the frame. The free end of the plate is bent downwardly, as indicated at 18, and engages the end wall 3 of the frame, thus spacing the plate 17 from the frame at one end, so as to afford a limited yielding movement of the plate which serves to cushion the heater element against undue shocks and vibrations incident to handling of the heater unit. The central portion of each plate 17 is struck upwardly, as indicated at 19, to form a boss which fits into the lower end of the tubular element 5.

Attached to the opposite side walls 2, 2 of the frame 1 is a stepped tire-engaging member 20, which is progressively spaced outwardly from the frame for greater distances at different points. This tire-engaging member may be secured to the frame in any suitable manner, as by means of screws 21, or other suitable fastenings.

In the use of the heater unit for pre-drying rubber tires, the tire is placed in an upright position and then the heater unit is inserted into the tire, between the opposite beads, so that it projects into the tire cavity adjacent to the point or section of the tire which is to be subsequently repaired. In thus inserting the heater unit, the tire beads 22, 22 are engaged with the stepped members 20, 20, at such points along the latter members as will spread the tire beads to an extent sufficient to cause the tire beads to firmly grip the heater unit therebetween. The point at which this engagement takes place will, of course, depend upon the size of the tire. Due to the stepped arrangement of the members 20, 20, the heater unit can be employed with tires of different sizes. When so inserted, the heater unit will be suspended from the tire as shown in Figures 1 and 2 of the drawing, and is sustained in position by the gripping action of the tire beads designated 22, 22. The best results are obtained when the heater unit is inserted in the uppermost side of the tire inasmuch as the heat tends to rise and will more effectively heat the section of the tire immediately above the heater unit. However, the heater unit may be inserted at any desired point in the tire, whether at the top or at the bottom.

Through the use of my drier unit, a large tire, such as a tractor tire, may be thoroughly dried within two or three hours, so that it is ready for repair with perfect safety and the assurance of a satisfactory bond at the point of vulcanization.

While the specific details have been herein shown and described, my invention is not confined thereto, as changes and alterations may be made without departing from the spirit thereof as defined by the appended claims.

I claim:

1. A tire drier of the class described, comprising an elongated box-like frame of substantially greater height than width, and a heater element mounted within the frame, said frame and heater element being insertable into a tire between the tire beads and sustainable in its inserted position by the gripping action of the beads, and said frame including a stepped tire bead-engaging member at each side of the frame for spreading the tire beads progressively wider apart in proportion to the distance the frame and heater element are inserted in the tire.

2. A tire drier as defined in claim 1, wherein the heater element comprises a plurality of tubular members of electrical insulating material extending from top to bottom of the frame in spaced parallel relation to each other, and a heater coil of electrical resistance wire wound upon each tubular member.

3. A tire drier of the class described, comprising a frame, a heater element mounted within the frame, said frame and heater element being insertable into a tire between the beads, said frame having steps of varying widths to control the spread of the tire beads when inserted in the tires of various sizes.

KOY E. ADAMS.

REFERENCES CITED

The following references are of record in the file of this patent:

UNITED STATES PATENTS

| Number | Name | Date |
|---|---|---|
| 1,654,313 | Tuttle | Dec. 27, 1927 |
| 1,914,190 | Herr | June 13, 1933 |
| 915,465 | McBride | Mar. 16, 1909 |
| 1,806,727 | White | May 26, 1931 |